(12) United States Patent
Poliwoda et al.

(10) Patent No.: US 11,335,005 B2
(45) Date of Patent: May 17, 2022

(54) METHOD AND DEVICE FOR DETECTING CORNERS

(71) Applicant: Volume Graphics GmbH, Heidelberg (DE)

(72) Inventors: Christoph Poliwoda, Mannheim (DE); Thomas Gunther, Heidelberg (DE); Christof Reinhart, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 104 days.

(21) Appl. No.: 16/488,927

(22) PCT Filed: Oct. 18, 2017

(86) PCT No.: PCT/EP2017/076597
§ 371 (c)(1),
(2) Date: Aug. 26, 2019

(87) PCT Pub. No.: WO2018/153511
PCT Pub. Date: Aug. 30, 2018

(65) Prior Publication Data
US 2020/0065972 A1 Feb. 27, 2020

(30) Foreign Application Priority Data
Feb. 24, 2017 (DE) .................... 10 2017 103 953.8

(51) Int. Cl.
*G06T 7/13* (2017.01)
(52) U.S. Cl.
CPC ...... *G06T 7/13* (2017.01); *G06T 2207/20164* (2013.01)
(58) Field of Classification Search
CPC ............. G06T 7/13; G06T 2207/20164; G06T 2207/20012
See application file for complete search history.

(56) References Cited

U.S. PATENT DOCUMENTS

2006/0262989 A1  11/2006  Tegenbosch et al.
2012/0257791 A1* 10/2012  Woo .......................... G06T 7/13
                                                        382/103
2015/0312550 A1* 10/2015  Robert ................. H04N 13/271
                                                         348/46

FOREIGN PATENT DOCUMENTS

DE   10 2014 100 419 A1   7/2015
DE   10 2014 115 851 A    5/2016
(Continued)

OTHER PUBLICATIONS

Ramakant Nevatia: "Chapter 7: Edge and Curve Detection" In: "Machine Perception", Jan. 1, 1982, Prentice Hall, XP055435541, ISBN: 978-0-13-541904-5, pp. 100-127, section 7.1.2.
(Continued)

*Primary Examiner* — Siamak Harandi
(74) *Attorney, Agent, or Firm* — SoCal IP Law Group LLP; Angelo J. Gaz

(57) ABSTRACT

Described is a computer-implemented method for determining material interfaces of an object from at least one measurement of the object, a rasterized representation of the object being produced by means of the measurement, the rasterized representation having a plurality of measurement points, a measurement point having at least one piece of image information, which indicates a value of a measurement variable for the object at the position of the measurement point. The method comprises the determining of a parameterization of the rasterized representation of the object, the parameterization assigning at least one parameter to each of the measurement points of a subset of the measurement points of the representation, and the applying of at least one parameter-dependent edge-detection operator to the measurement points of the rasterized representation, an edge-detection operator being designed to determine the (Continued)

Figure 1:
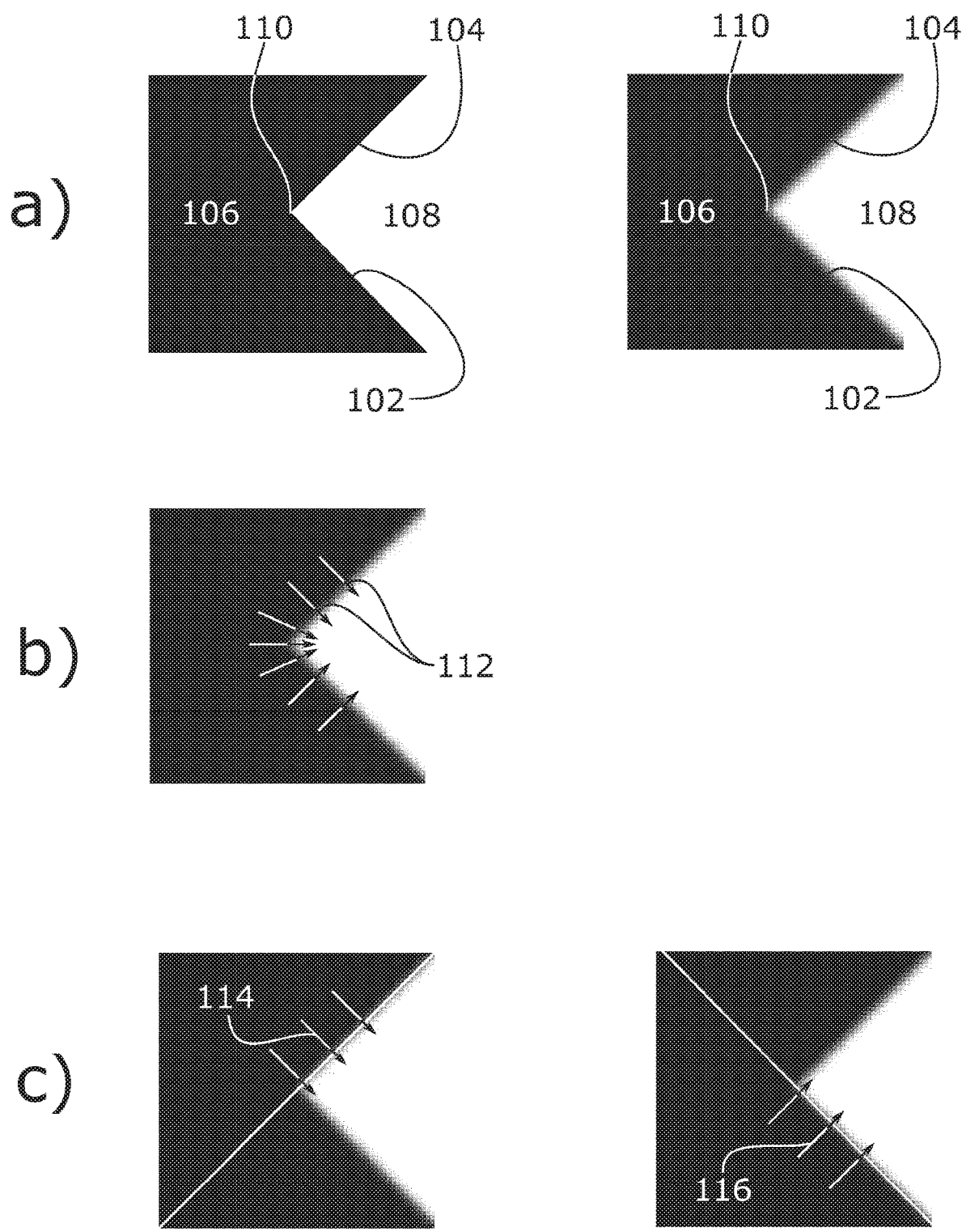

location of at least one material interface in the rasterized representation.

26 Claims, 3 Drawing Sheets

(56) References Cited

FOREIGN PATENT DOCUMENTS

| EP | 0 930 499 A1 | 7/1999 |
|---|---|---|
| JP | 2008-541110 A | 11/2008 |
| JP | 20080541110 | 11/2008 |
| JP | 20120201099 | 10/2012 |
| JP | 2014-55864 A | 3/2014 |

OTHER PUBLICATIONS

European Patent Office/International Searching Authority, Written Opinion for PCT Application No. PCT/EP2017/076597, dated Jan. 3, 2018, 7 pages.

European Patent Office/International Searching Authority, International Search Report for PCT Application No. PCT/EP2017/076597, dated Jan. 3, 2018, 3 pages.

German Patent Office, Office Action for German Patent Application No. 10 2017 103 953.8, dated Mar. 13, 2018, 3 pages.

Japan Patent Office, Notification of Reasons for Rejection for Japanese Patent Application No. 2019-546374, dated Jan. 26, 2021.

Takahiro Nakamura et al., "The Fan Operator for Detection of Junctions, Corners and Edges," IEICE technical report, vol. 91, No. 438, Japan, Institute of Electronics, Information and Communication Engineers, 1992, vol. 91, pp. 11-18.

Takahiro Nakamura et al., "The Fan Operator for Detection of Junctions, Corners and Edges," IEICE technical report, 76-17, Japan, Jan. 24, 1992, pp. 119-126.

D. Ziou, et al., "Edge Detection Techniques—an Overview," Image Recognition, Analysis, Understanding, and Processing Techniques, Pattern Recognition and Image Analysis, vol. 8, No. 4, May 26, 1998, pp. 537-559.

European Patent Office, Examination Report, in patent No. 17 793 608.5-1210, Volume Graphics GmbH, Oct. 13, 2021, pp. 1-8.

Japanese Intellectual Property Office, Office Action, in patent No. 2019-546374, dated Sep. 14, 2021. pp. 1-3.

\* cited by examiner

METHOD AND DEVICE FOR DETECTING CORNERS

The invention relates to a computer-implemented method for determining material interfaces of an object.

The determination of the location of material interfaces in an object by imaging techniques is a ubiquitous problem in the state of the art. A material interface describes in an object such as a workpiece, exactly that boundary surface along which different materials in the object are adjacent to each other. In addition to boundary surfaces within an object, along which, for example, a transition from a plastic to a metal occurs, a material interface can also be understood to mean the surface which delimits an object with respect to its surroundings or the ambient air. Thus, the determination of boundary surfaces can also be used, in particular, for determining the dimensions of scanned objects. A technical field in which the exact determination of interfaces is increasingly gaining in importance is, for example, the computer tomographic investigation of workpieces, which is used inter alia in manufacturing for quality assurance purposes.

Regardless of the type of imaging procedure used, the problem exists in the prior art that known algorithms for determining material interfaces are not capable of determining the exact location of material interfaces in areas where two or more interfaces meet at an angle. In particular, due to smearing effects in the generation of the images of the geometry under investigation, the determination of the exact position of the coincidence of the differently oriented material interfaces is not possible using known methods from the prior art. Such geometries are often found on workpieces, for example in the area of cutting edges or drilled holes. The exact determination of the location of such angles is necessary for the exact determination of the dimensions of the geometries, and in the field of quality assurance, for example, it is essential. Consequently, there is a great demand for a technology which enables the exact detection of "corners", that is, the regions in which two or more material interfaces meet at an angle.

The main features of the invention are specified in this document.

In a first aspect the invention relates to a computer-implemented method for determining material interfaces of an object by means of at least one measurement on the object, wherein a rasterized representation of the object is generated by the measurement. The rasterized representation has a plurality of measurement points, each measurement point having at least one image information item. The image information item indicates a value of a measurement variable for the object at the position of the measurement point. The method according to the invention then comprises determining a parameterization of the rasterized representation of the object, the parameterization assigning at least one parameter to each of the measurement points of a subset of the measurement points of the representation. At least one parameter-dependent edge-detection operator is then applied to the measurement points of the rasterized display. An edge-detection operator is designed to determine the location of at least one material interface in the rasterized representation.

In the determination of the location of a material interface from the image information of a measurement point, the edge-detection operator takes into consideration at least the image information of a subset of the measurement points adjacent to the measurement point in the rasterized representation. At least one of the parameters of a measurement point defines an analysis direction within the rasterized representation. The edge-detection operators are designed, when applied to a measurement point, to determine the location of at least one material interface along the analysis direction defined by the parameter of the measurement point. For a subset of the measurement points an analysis direction is defined in each case by at least two of the parameters of a measurement point, at least one edge-detection operator being applied to the measurement point per analysis direction, which edge-detection operator determines the location of at least one material interface along the respective analysis direction.

To perform the measurement, any imaging procedure can be applied. Particularly relevant techniques here are computed tomography, magnetic resonance imaging, positron emission tomography and 3D sonography.

The analysis direction defined by a parameter can be derived, for example, from the knowledge of the basic geometrical shape of the object being scanned. Experiments have shown that by using a fixed definition of the analysis direction the precision of the edge detection can be improved compared to known methods from the prior art, which determine the analysis direction, for example, from a gradient of the gray-scale values. In addition, in the definition of the analysis direction particular geometries or characteristics of the object being scanned can be considered, which could not be taken into consideration if the analysis direction were determined in other ways, for example by determining a gradient of the gray-scale values. The analysis direction used in the determination of a material interface is preferably perpendicular to the material interface to be determined.

The specification of a plurality of analysis directions in which material interfaces are sought on the basis of a measurement point has the advantage that even complex geometries that are only imprecisely detectable with known methods from the prior art, such as right-angled corners, can be detected reliably and accurately. For example, in determining the analysis direction from a gradient of the gray-scale values, as is known from the prior art, a reliable and accurate detection of corners and angles is not possible. In fact, when using an analysis direction determined from a gradient, in the region of the corners a "blurring" or "rounding off" of the interfaces can be seen, as a result of which material interfaces in the region of corners do not appear pointed, but rounded instead. However, if the analysis of such a corner is separated into one analysis per edge direction, then the previously mentioned effects of the unclean edge detection in the region of angles and corners can be avoided.

The rasterized representation of the scanned object, which is generated as a result of the measurement, can be both two-dimensional and three-dimensional. In the case of a three-dimensional representation the measurement points are volume pixels or voxels, while in the two-dimensional representation the image points are simple pixels. The image information of a voxel reflects the mean value of a measurement variable for the object, which is obtained by a convolution of an environment around the voxel under analysis with the point spread function (PSF) of the system used. It is also possible to decompose a three-dimensional representation of an object into a series of two-dimensional cross-sectional images of the three-dimensional representation.

A "value of a measurement variable" is generally a numeric value that quantifies a particular property of a material of the scanned object in such a way that the corresponding material can be distinguished from other materials in the rasterized representation. The value of the measurement variable is not to be confused with the parameter or parameters of a measurement point, which are assigned to the measurement points as a result of the parameterization of the rasterized representation. While the value of the measurement variable describes the material or a material property of the scanned object, the parameters provide additional information for the parameterization, which can be used in the determination of material interfaces. For example, if the imaging procedure used for the measurement is a computed tomography, the value of the measurement variable can describe, for example, the degree of attenuation which X-ray radiation undergoes when it passes through the corresponding material. The measurement variable under consideration would therefore be the X-ray density of the irradiated medium. If, on the other hand, the imaging procedure is magnetic resonance imaging, then the value of the measurement variable can be the resonance frequency or the relaxation time of the material.

The raster used for the rasterized representation can have essentially any desired shape. In the simplest case, the raster has orthogonal axes which are divided into segments at regular intervals in all three spatial directions. The volume circumscribed by each segment in all spatial directions then defines exactly one voxel. The raster used is not restricted to such a uniform and orthogonal raster, however. Instead, the axes of the raster can also follow other arrangements, so that a different, for example non-cubic shape, is obtained for the voxels. Thus, a hexagonal raster can also be implemented. In this case not all voxels or pixels in the rasterized representation need to be the same size. It is also possible, for example, to combine a plurality of measurement points with identical image information in a single voxel or pixel.

A "parameter", as described earlier, can be understood according to the invention as an arbitrarily complex variable. To define an analysis direction, the parameter can define, for example, a direction in the raster of the rasterized representation in the form of a vector. Furthermore, a parameter could also contain information regarding the materials which come into contact with one another at a material interface. For example, an expected item of image information of a measurement point could thus already be coded by the parameter. Other arbitrarily complex information items which are relevant for determining a material interface can also be subsumed under the term "parameter".

In the field of digital image processing, operators for the analysis and processing of image data are known in a wide range of variants. A prominent example of an operator, which is frequently used in digital image processing for the detection of edges, is the Sobel operator. The Sobel operator is essentially a tensor of rank n with defined entries. The rank of the tensor depends on the number of dimensions of the scanned image. Such an operator is applied to an image or a pixel by performing a discrete convolution of the image data of a picture with the tensor of the operator.

In the context of the present application, however, the term "operator" is not necessarily to be understood as a simple tensor. In fact a single operator in the context of the present invention can be an arbitrarily complex combination of convolution tensors, arithmetic operations, curve fits or similar, which are executed consecutively in a certain sequence and, in each case, apply further processing to the results of previous operations of the operator. An operator in the context of the present application does not also necessarily have to contain a convolution tensor in the sense of the Sobel operator described above. Rather, it is also possible for an operator to completely forego implementing a convolution of the image data with a convolution tensor. The only relevant factor in the definition of an operator is that the application of the operator to the image data achieves the desired result, namely the detection of material interfaces.

The meaning of the expression "apply a parameter-dependent operator" can vary depending on the particular application and the type of operator. So, as stated previously, a parameter can indicate, for example, in which direction a material interface is to be sought. In this case, the parameter dependency consists in the fact that, depending on the value of the parameter, one or more of the operations carried out during the application of an operator are adapted to the analysis direction specified by the parameter, or take this into account. The parameter dependence, on the other hand, may also be expressed in the fact that different operators are applied depending on the value of the parameter. A parameter can thus influence the execution of an operator in diverse ways. For example, a parameter can encode an offset which is to be taken into account in the implementation of an arithmetic operation. In addition, a parameter can also specify a certain amount of measurement points, which are to be taken into account in the application of the operator. It is also possible that the parameter encodes an additional item of information which has an effect on the application of the operator. In this way, the parameter can also include, for example, the impulse response of the imaging system, also known as the point spread function (PSF), so that this can be allowed for in the application of the operator.

According to the invention, the location of a material interface is not specified by the raster or the arrangement of the raster points. Instead, the position of a material interface identified in the course of the method can also be located between the raster points. Thus, the method according to the invention also makes a sub-pixel- or sub-voxel-accurate determination of material interfaces possible, wherein interfaces can be determined with an accuracy of $\frac{1}{100}$ voxel and less, depending on the quality of the measurement data.

An "analysis direction" can be understood to mean a direction within the raster of the selected representation of the object. For example, the analysis direction can be specified by a vector, for example, which is defined in the coordinate system spanned by the raster.

According to one embodiment it is provided that the image information of a measurement point comprises at least one gray-scale value, which indicates the value of the measurement variable for the object at the location of the measurement point. The at least one edge-detection operator is designed to determine the location of the material interface on the basis of a measurement point using a fit of a theoretical model of the gray-scale values for a material interface to the gray-scale values of measurement points and/or values derived from the gray-scale values in the vicinity of the measurement point. The term "at the location of the measurement point" describes exactly the point or spatial region of the investigated object, which corresponds to the pixel or voxel being observed in the rasterized representation. In order to detect a material interface, the observed measurement point must be placed in close proximity to the material interface. The phrase "close proximity to a material interface" here is defined as the set of all the pixels whose gray-scale value is affected due to the impulse response of the system used by the gray-scale values of measurement points, which represent the material interface to be detected.

The theoretical curve of the gray-scale values for a material interface can be determined by taking into account a number of influencing factors. For example, it is thus possible to take into account the effect of the PSF of the imaging system used for recording the measurement points in the creation of the theoretical model. The PSF of an imaging system leads in general to a "smearing" of the measurement values, so that in the image genuinely sharp edges of a scanned object, such as are found at material interfaces, appear as a washed-out, gradual transition. In the determination of the theoretical curve, other factors can also be considered, where known, which give rise to a non-ideal image of the object in the measurement on the object. To fit the theoretical curve to the measurement values any suitable error minimization method can be used. For example, here the method of least-squares can be applied. By choosing the iterations performed for curve fitting, the accuracy of the edge detection can be balanced against the necessary computational load.

If an analysis direction is specified by the parameter of a measurement point, then according to one embodiment this is taken into account by a curve fit in the determination of a material interface, by the fact that at least one edge-detection operator is designed to determine the location of a material interface by means of the fit along the analysis direction indicated by the at least one parameter. For example, for this purpose the gradient of the gray-scale values can be determined starting from the observed measurement point along a vector in the direction of the analysis direction. By fitting a theoretical curve of the gray-scale values for a material interface to the curve of the gray-scale values determined in this way, the position of a material interface can then be determined.

The parameterization which is used according to the invention in the determination of material interfaces is determined according to one embodiment from a model of the scanned object. So, for example, directly from a model, it is possible to derive the points at which corners and angles are present and how the interfaces that meet at the corner are aligned. The parameter model thus determined can then be transferred to the data from a measurement on the object, so that the subsequent determination of the material interfaces can be carried out using suitable edge-detection operators, which in turn depend on the parameters of the parameterization. Such a model can be derived using a further measurement process, for example by means of an optical measurement. For example, the interface of the object to be examined can be first scanned by means of a laser, so that a surface model can be created.

Alternatively, according to one embodiment the model of the object examined can be a CAD model. The use of a CAD model has the advantage that the model of the examined object already exists completely in digital form with the planned dimensions, so that it is transferable with very little effort to measurement data from a measurement on the object.

In addition to the use of a CAD model, in accordance with another embodiment it can also be provided that the parametrization is generated by at least one user input. For example, it can be provided that a user who monitors the examination of the object inspects the rasterized representation of the scanned object generated in the course of the measurement and using an appropriate input device, either visually or on the basis of experience values, marks areas in which corners and angles are present. In addition, the user can also define the analysis directions for the subsequent edge detection by means of a corresponding interface in the indicated rasterized representation.

In addition to the previously described embodiments for determining the parameterization, according to a further embodiment the parameterization can also be determined from the image information of at least a subset of the measurement points. The subset of pixels used in this process is preferably selected so that it at least represents the material interfaces present in the object representation. Preferably, the subset of pixels also represents a region around the material interfaces, so that a sufficient amount of image information is available for determining the parameterization. The direct determination of the parameterization from the image information itself has the advantage that an automation of the edge-detection is easier to achieve, since apart from the actual measurement data no additional information is necessary for the determination of the parameterization and the subsequent edge detection.

According to a further embodiment, at least one of the edge-detection operators is a multiple edge-detection operator, which is designed, when applied to a measurement point, to determine the location of at least two directly adjacent material interfaces in the object. In this case, the multiple edge operator is applied to a measurement point precisely at the time when at least one of the parameters of the measurement point indicates that within the vicinity of the measurement point a plurality of material interfaces is arranged directly adjacent to each other.

The parameter-dependent application of an edge-detection operator which is able to also resolve directly adjacent material interfaces, has the advantage that even very thin structures such as cracks and coatings can be detected in an examined object. Experiments have shown that algorithms for targeted search for a sequence of directly adjacent material interfaces involve an increased computational effort compared with algorithms for determining a single, isolated material interface. However, this increased computational effort is reduced to a manageable level according to the invention, by a multiple edge-detection operator being applied on the basis of a parameterization of the measurement points only if the application is indicated by a corresponding parameter of the measurement points. Thus, the computational effort for detecting multiple edges is reduced to a minimum. If the parameterization of a measurement point, on the other hand, does not indicate that a multiple edge-detection operator should be applied, in the method it is provided that an edge-detection operator which is designed only for the detection of a single material interface is applied to the measurement point.

For this purpose, a single parameter of a measurement point can indicate, for example, whether or not a direct sequence of adjacent material interfaces exists in the area around the measurement point. In this case, the parameter could be defined as a binary variable. The parameter could also provide information as to how many material interfaces are present in the immediate vicinity of the measurement point. Finally, a parameter could also contain information regarding the materials which come into contact with one another at the material interface or interfaces.

Known methods from the prior art for detecting material interfaces are often not able to distinguish a dense sequence of directly adjacent material interfaces from a single material interface, or to accurately determine the respective locations of the individual material interfaces in a dense sequence of material interfaces arranged next to one another.

This is mostly attributable to blurring effects in the generated images of the object being examined. The term "directly adjacent material interfaces" is therefore understood to mean all those sequences of material interfaces that can no longer be resolved as individual material interfaces by an edge-detection operator which is designed only to detect a simple material interface. In this definition, the term "directly adjacent" can refer to different length dimensions depending on the imaging method used and the measurement situation. In the case of a highly magnified image of an object with a very fine focus of the measuring apparatus, the expression "directly adjacent" can thus involve a distance between two interfaces of a few microns, while at a lower magnification a sequence of "directly adjacent material interfaces" can also exist at a distance of a few millimeters between the material interfaces.

In this case it can be provided according to one embodiment that a parameter of a measurement point indicates not only whether a multiple edge is present in the immediate vicinity of the measurement point, but also how many individual material interface layers the multiple edge contains. Accordingly, in applying the multiple edge-detection operator the exact expected theoretical gradient of the gray-scale values can be used for determining the locations of the material interface layers which was determined under the assumption of the correct number of individual material interface layers.

If the position of the individual material interfaces is determined by fitting the theoretical curve of the gray-scale values to the actually measured gray-scale values, the theoretical curve of the gray-scale values can be determined as a function of the expected number of material interface layers. By fitting the theoretical curve of the gray-scale values of a multiple edge to the existing gray-scale values, the position of each individual material interface layer can be determined in an efficient manner.

A further aspect of the invention relates to a device for carrying out measurements on an object and for determining material interfaces of an object by means of at least one measurement on the object, wherein a rasterized representation of the object is generated by the measurement. The rasterized representation has a plurality of measurement points, each measurement point having at least one image information item which indicates a value of a measurement variable for the object at the position of the measurement point. The device is designed to perform at least one measurement on the object and to determine a parameterization of the rasterized representation of the object obtained from the measurement, the parameterization assigning in each case at least one parameter to the measurement points of a subset of the measurement points of the representation. The device is further designed to apply at least one parameter-dependent edge-detection operator to the measurement points of the rasterized representation, an edge-detection operator being designed to determine the location of at least one material interface in the rasterized representation.

In determining the location of a material interface from the image information of a measurement point, the edge-detection operator takes into consideration at least the image information of a subset of the measurement points adjacent to the measurement point in the rasterized representation. At least one of the parameters of a measurement point defines an analysis direction within the rasterized representation, wherein when applied to a measurement point, the edge-detection operators are designed to determine at least one material interface along the analysis direction defined by means of the parameter of the measurement point. For a subset of the measurement points an analysis direction is defined in each case by means of at least two of the parameters of a measurement point of the subset, at least one edge-detection operator being applied to the measurement point for each analysis direction, which edge-detection operator determines the location of at least one material interface along the respective analysis direction.

A still further aspect of the invention relates to a computer program product having instructions executable by a computer, which when executed on a computer cause the computer to carry out the methods as described herein.

Figure 2:
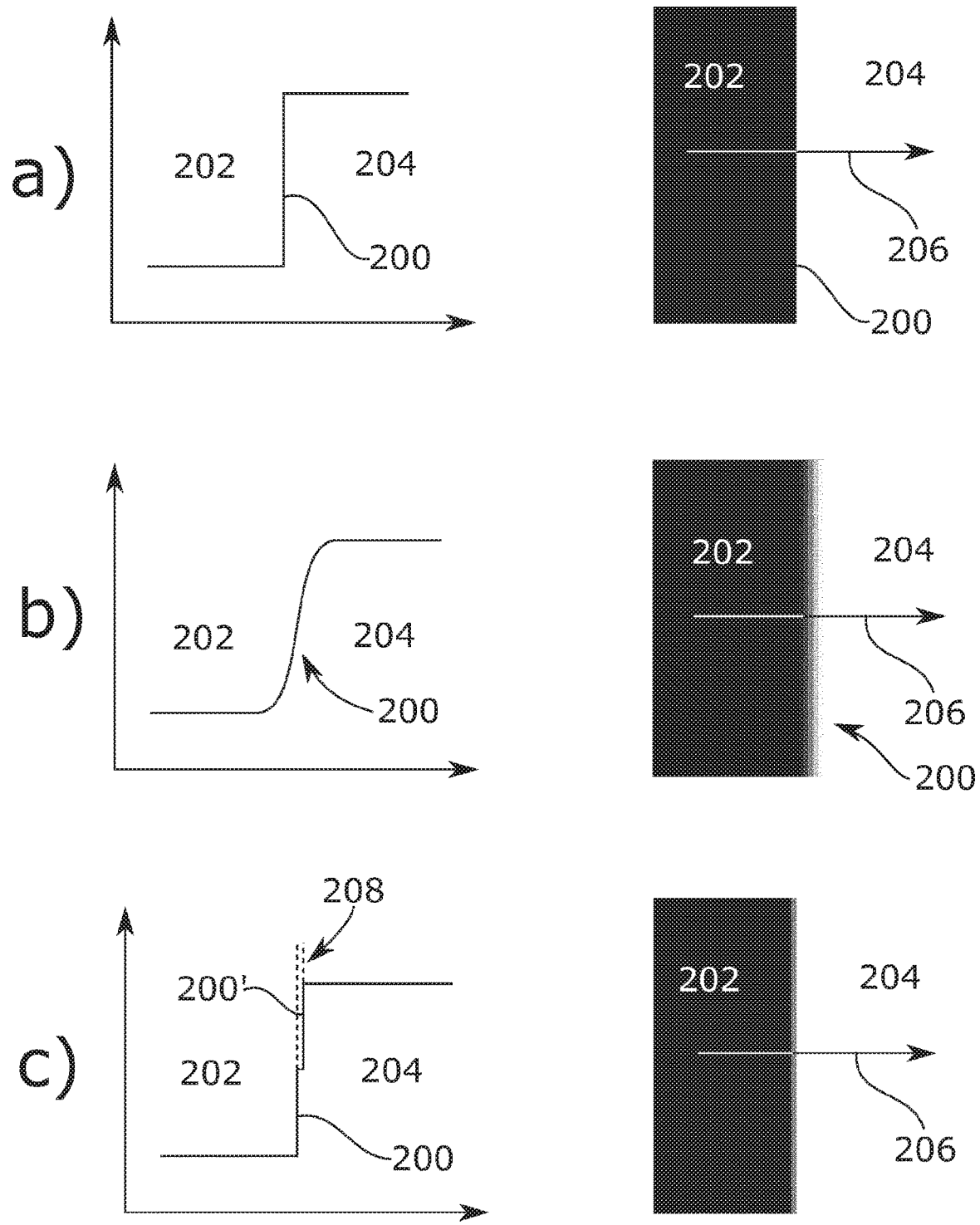
Figure 3:
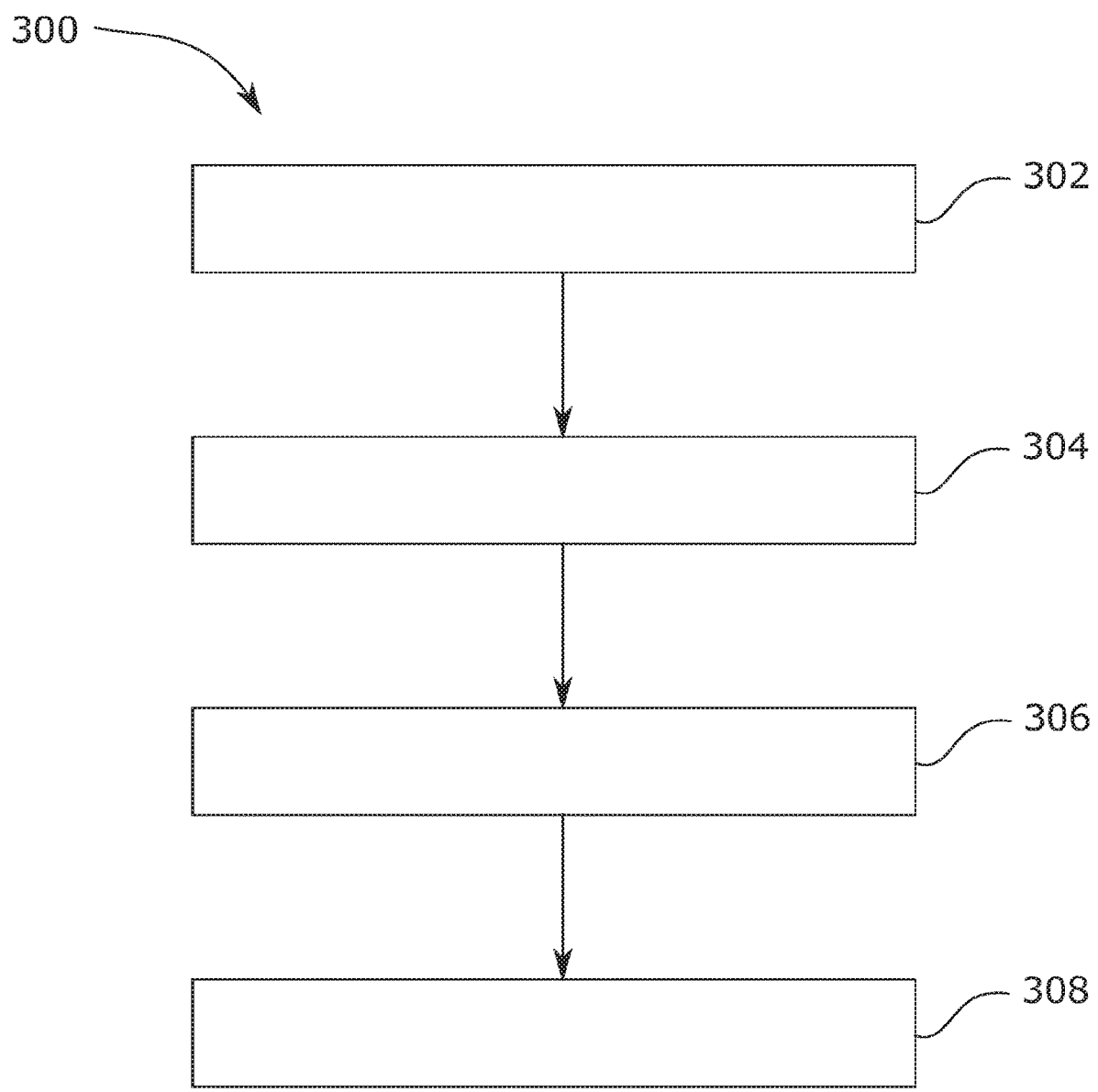

Further features, details and advantages of the invention result from the wording of the claims, as well as from the following description of embodiments on the basis of the drawings. Shown are:

FIG. 1 schematic representations of a corner with different analysis directions, FIG. 2 schematic representations of a simple material interface and a multiple edge, and FIG. 3 a flow chart for implementing the method according to the invention.

In the following, similar or identical features are identified with the same reference symbol.

FIG. 1 a) shows a schematic representation of a corner, thus a geometry in which two material interfaces 102 and 104 meet at a right angle. A material interface in this case characterizes exactly that interface at which a first material and a second material meet. If such a geometry is imaged by an imaging process such as computed tomography, the image shown on the right of FIG. 1 a) is obtained, for example.

In the scanning of an object by computed tomography, the object is irradiated by means of X-rays, wherein after passing through the examined object the X-rays expose a detector located behind the object. Due to different X-ray densities of the materials present in an object, the X-rays penetrating the object are attenuated to varying degrees, so that from the X-ray intensity absorbed by the detector the respective density or X-ray absorption of the irradiated media of the scanned object can be deduced. In the case of computed tomography, X-ray images are taken from different directions, wherein from the sum of the X-ray images a three-dimensional picture of the object is subsequently reconstructed. The representation shown in FIG. 1 a) is a two-dimensional cross-sectional view, which can be derived from the three-dimensional image. The invention is not limited to such a two-dimensional image, however, but can also be applied in a three-dimensional image. The two-dimensional image was chosen solely in the interests of a simpler illustration.

The material interfaces 102 and 104 shown in FIG. 1 a) can be, for example, the transition from air to a metal. Due to the lower X-ray absorption of air, the region 106 on the left appears darker than the region 108 on the right.

If one compares the ideal corner, which is shown on the left in FIG. 1 a), with the corner imaged by means of an imaging procedure on the right in FIG. 1 a) the material interfaces 102 and 104, which in reality are sharply bounded, are blurred and vague. In particular, the vertex 110 of the corner illustrated, i.e. the point at which the material interfaces 102 and 104 coincide, appears rounded. The cause of such a blurring of the image has various technical reasons. From the theory of electrical signal processing, it is known that a signal can only ever be processed with a limited bandwidth. Therefore, a sharp edge, which mathematically corresponds to a superposition of an infinite number of periodic signals, cannot be implemented in signal and image processing. In fact, the point spread function (PSF) of the imaging system always affects the image of an object. Mathematically, the effect of the band-limited imaging system corresponds to a convolution of the signal to be imaged with the PSF of the system. The PSF of an imaging system often has the approximate form of a Gaussian bell-curve.

The convolution of the sharp edges or material interfaces 102 and 104, as shown in FIG. 1 a), with a Gaussian PSF of the imaging system results in blurred edges, in which the exact position of the material interfaces 102 and 104 is no longer clearly identifiable. In the region of the corner, the convolution of the actual object with the PSF of the imaging system also gives rise to a rounding of the shape of the interface. There are various approaches in the prior art with which an edge position can be determined from such an edge profile despite the blurred interface. A prominent example of this is the Canny algorithm, which uses the gradient and the second derivative of the gray-scale value curve to determine the edge position. Another approach to the determination of the edge position is to determine the difference between the maximum and minimum gray-scale value in the regions 106 and 108 and subsequently to assume that the edge must be located at the point where the gray-scale value is equal to half of this difference.

Algorithms which take advantage of the gradient of a gray-scale value curve in order to determine the position of a fuzzy material interface, however, will inevitably produce an error in the determination of the position of the material interfaces in the case of a blurred corner in the region of the vertex 110. Examples of the local gradients along the material interfaces are shown in FIG. 1 b) by arrows 112. In the areas where the material interfaces 102 and 104 have a straight path and the gray-scale values of the material interfaces 102 and 104 are not affected by the transition in the region of the vertex 110, the gradient is actually perpendicular to the material interfaces 102 and 104. Thus in an application of the Canny operator here, good results are to be expected in the determination of the position of the material interfaces.

In the region of the vertex 110 however, this approach no longer works. As clearly shown in FIG. 1 b), in the region of the vertex 110 the gradient changes direction only gradually from its orientation in the region of the first material interface 102 to the orientation in the region of the second material interface 104. However, if the corner had been imaged perfectly, the gradient at the vertex 110 should instantaneously "flip over" from its first orientation to the second orientation. Due to the blurred corner, however, this is not the case. Consequently, a sharp corner would not be detected by the Canny operator, but only a rounded corner. The exact position of the vertex 110 and the exact course of the material interfaces 102 and 104 up to the vertex are thus not detectable using the Canny operator.

An example solution according to the invention for this situation is shown in FIG. 1 c). In accordance with the invention, in the determination of the material interfaces 102 and 104 the direction along which a material interface should be sought is fixed in advance. Thus, for a first material interface 102 a first analysis direction 114 (left) is defined and for a second material interface 104 a second analysis direction 116 (right) is defined. In so doing, the analysis directions are maintained over the entire width of the material interfaces 102 and 104. This leads, among other things, to the fact that in the region of the vertex 110 a material interface is sought in multiple directions from individual measurement points. Therefore, according to the invention a plurality of parameters are assigned to these measurement points, each of which defines an analysis direction. This is not explicitly shown in FIG. 1 c), however, for the sake of clarity. By the fixed specification of the analysis direction, in particular in the region of the vertex 110 an exact determination of the location of the material interfaces 102 and 104 is possible.

Although in FIG. 1 only the two-dimensional case is shown, the invention is also applicable in an analogous manner in a three-dimensional representation of an object. In this scenario, individual measurement points can certainly be assigned more than two parameters for defining an analysis direction.

FIG. 2 a) shows a schematic view of an idealized, but technically not feasible, representation of a material interface 200, which represents the junction between a first region 202 with a first material (such as air) and a second region 204 with a second material (such as a metal) in an object. On the right a two-dimensional, idealized representation of the transition is shown. The different material-specific parameters of the first and second material are represented by way of example by different gray-scale values. For example, the material-specific parameter can be the X-ray density thereof.

On the left-hand side of FIG. 2 a), a representation is also shown of the material-specific parameter or the X-ray density along the arrow 206. The arrow 206 here is aligned perpendicular to the material interface 200. The position along the arrow 206 is plotted on the horizontal axis, while the corresponding X-ray density is plotted at each position on the vertical axis. The transition between the regions 202 and 204 is shown as a sharp interface, which can be described mathematically by a step function. As already stated previously, FIG. 2 a) shows only an ideal representation of a material interface 100. Such a representation, however, is technically not feasible due to various circumstances, as has already been stated.

FIG. 2 b) shows a real representation of the same material boundary 200. Here, also, a two-dimensional plan view of the material boundary 200 is shown on the right, while the profile of the X-ray density is shown along the arrow 206. For the reasons already explained, the sharp transition 200 from the first region 202 to the second region 204 is blurred due to the impulse response of the system used for imaging the structure, so that the exact position of the interface 200 is initially no longer directly identifiable.

The Canny algorithm described earlier, as well as other algorithms for detecting edges, are essentially able to derive the position of the material interface 200 from the blurred course of the material interface 200 shown in FIG. 2 b). These approaches are problematic, however, as soon as the interface is not an isolated one, but a sequence of closely adjacent material interfaces. An example of one such case is shown in an idealized, non-blurred view in FIG. 2 c). Here also, the first region 202 contains air, for example, while in the second region 204, for example, a metal is present. The image shown in FIG. 2 c), for example, can be produced if the metal in the region 204 is provided with a coating on its surface, whose specific X-ray absorption differs from the absorption by metal. The coating is then visible as an additional region 208 with a different gray-level from that of air and metal. This region 208 is very narrow. A coating can be, for example, a layer with a thickness of a few microns.

The previously described "smearing" of the edge profile due to the PSF of the system now gives rise to the fact that the smeared profile of the simple material interface is barely distinguishable from a sequence of closely adjacent material interfaces. In fact, the result of a convolution of the edge profile shown in FIG. 2 c) appears very similar to the edge profile shown in FIG. 2 b). Consequently, with the methods known in the prior art a distinction of a simple edge from a sequence of adjacent edges, i.e. a "multiple edge", is initially impossible because these algorithms are not able to detect the individual interfaces.

According to one embodiment, however, the position of the individual material surfaces can also be determined from the smeared profile of a multiple edge, if in the examination of the gray-scale value it is already known that it is not an isolated interface, but a multiple edge. From the knowledge that a multiple edge is present, it is possible to derive how such a multiple edge should look after a convolution with the PSF of the system. By comparing the model thus obtained with the existing curve of the gray-scale values and/or with a curve of values derived from the gray-scale values, the positions of the individual material interfaces of the multiple edge can be determined. In accordance with the invention, by parameters assigned to the pixels it is indicated whether in the examination of a gray-scale value curve in the region of a material interface an isolated interface can be assumed, or whether a multiple edge is present, so that an appropriate model can be applied.

It is also entirely possible within the context of the present invention to examine geometries which represent a combination of the circumstances shown in FIGS. 1 and 2. For example, it is also possible that one or both of the material interfaces 102 and 104 shown in FIG. 1 are coated once again, so that the situation shown in FIG. 2 *c*) is obtained. In this case, in particular during the examination of the vertex 110 it can be provided that a plurality of closely consecutive material interfaces is sought in multiple directions from a single measurement point. In this way, even in very complex geometries the exact positions of the material interfaces can be reliably determined.

The method according to the invention is not limited to a direct sequence of two material interfaces. Instead, it is also possible for any number of closely adjacent interfaces to be specified, so that in the analysis of the gray-scale values, for example, a sequence of five adjacent material interfaces is assumed. Such a sequence can arise, for example, in the case of a lacquered surface, in which a primer coat, a colored lacquer and a clear lacquer are applied on top of one another, each with a thickness of only a few microns.

FIG. 3 shows a flow diagram of an embodiment of the method according to the invention. For example, the method can be implemented with a device which comprises at least one computer tomograph and a data processing device connected to the computer tomograph. The data processing device is not necessarily in the form of a contiguous physical entity, but can also be distributed, for example in the sense of cloud computing.

In a first method step 302 of the method 300 shown in FIG. 3, a measurement is performed on an object to be analyzed. The object can be, for example, a component which has been extracted from a production line and is to be subject to a quality assurance inspection. The measurement is preferably a computer tomographic measurement, as has already been stated.

However, the method can in principle also be applied to the measurement results of other imaging techniques, such as magnetic resonance imaging and 3D ultrasound.

The measurement first generates raw data, which in the case of computer tomography, for example, correspond to a plurality of X-ray images of the object analyzed from a plurality of directions. From the raw data thus obtained a three-dimensional image of the examined object is generated in step 304, the representation being rasterized. To reconstruct the object, for example, a filtered reverse projection can be applied to the previously determined raw data. The rasterizing of the reconstructed object can then be carried out, for example, by the reconstructed object being superimposed with a three-dimensional lattice, each volume element of the lattice being assigned the corresponding local gray-scale value of the object in the region of the volume element (voxel). Usually, for example in computed tomography, the lattice is defined by the arrangement of the individual sensors of the sensor arrangement used. However, it is also possible to define a lattice that is different from this.

After reconstruction and rasterizing of the examined object, in step 306 a parameterization of the rasterized object is then determined. To this end, for example, a user interface can be provided, with which a user marks regions of the reconstructed object to be examined where particular geometries, such as corners and angles or multiple edges, are present. Also, in the course of the parameterization one or more directions can also be specified, in which material surfaces will be searched for starting from a voxel. In addition to input via a user interface, such a parameterization for specifying directions for the determination of an edge profile in the region of corners and angles can also be determined directly from the measured data itself.

In addition to a user input, a parameterization can also be determined by a first scanning of the reconstructed object for material interfaces. For this purpose, for example, under the assumption that the entire object has only straight, simple material interfaces, a sampling of the whole object can be first carried out, so that a plurality of edge positions is determined. The resulting edge positions can then be inspected as to how well the gray-scale value curve existing at the edge position fits the theoretically predicted gray-scale value curve for an isolated, straight material interface. If it is determined, for example using a chi-square test, that the original gray-scale value curve does not match the expected gray-scale value curve sufficiently well, a parameter is assigned to the voxels in the vicinity of the material interface being analyzed, indicating that a search for a multiple edge or a curved edge should be performed here.

Once the parametrization of the reconstructed object is completed, in step 308 parameter-dependent edge-detection operators are then applied to the reconstructed object. This involves applying to each voxel, or at least to a subset of the voxels, edge detection operators which determine the position of material interfaces from the gray-scale value of the voxel and the gray-scale values of the adjacent voxels. The type of the edge-detection operator applied is determined by the parameter that is assigned to the voxel. If the parameter defines, for example, one or more analysis directions, corresponding edge-detection operators are applied to the voxel, which search for a material interface in the analysis directions indicated by the parameter. If it is also indicated by a parameter of the voxel being analyzed that a multiple edge exists in the vicinity of the voxel, which is composed of three single material interfaces, a corresponding edge-detection operator is applied to the analyzed voxel, which searches for just such a multiple edge in the specified analysis direction. It may well be the case that a plurality of parameters are assigned to a voxel. Thus, the parameterization of a voxel can indicate a multiplicity of analysis directions, for example, but wherein for only some of the analysis directions is there an indication that a multiple edge is expected in the analysis direction. To determine the material interfaces the edge-detection operators are designed to create a theoretical model of the gray-scale value curve corresponding to the values of the parameterization, and to compare the model with the gray-scale values of the surrounding voxels. From the comparison of the actual gray-scale values with the theoretical model the exact positions of the material interfaces can then be determined.

The invention is not restricted to any one of the embodiments described above but may be modified in a wide variety of ways.

All of the specified features and advantages resulting from the claims, the description and the drawing, including constructional details, spatial arrangements and method steps, can be essential to the invention either in themselves or in the most diverse of combinations.

LIST OF REFERENCE NUMERALS 102 material interface
104 material interface
106 region
108 region
110 vertex
112 arrow
114 first analysis direction
116 second analysis direction
200 material interface
202 first region
204 second region
206 arrow
208 additional region It is claimed:

1. A computer-implemented method for determining material interfaces of an object from a rasterized representation of the object, the rasterized representation having a plurality of voxels corresponding to positions on the object, each of the voxels having at least one piece of image information which indicates a value of a measurement variable for the object at the position of the corresponding voxel, the method comprising:
for each of a plurality of voxels, based upon at least two parameters specific to the respective voxel, defining an analysis direction parameter within the rasterized representation consisting of a direction within the rasterized representation of the object specific to the respective voxel; and
applying an edge-detection operator to the analysis direction parameters of the plurality of adjacent voxels, wherein the edge-detection operator determines a location of at least one material interface in the rasterized representation from the image information of at least one of the plurality of adjacent voxels and from the image information of least some of the voxels adjacent to the at least one voxel.

2. The method of claim 1,
wherein the image information of each voxel comprises at least one gray-scale value indicating the value of the measurement variable for the object at the position of the voxel, and
wherein the at least one edge-detection operator determines the location of the material interface by means of a fit of a theoretical model of the gray-scale values for a material interface to the curve of the gray-scale values of voxels in a vicinity of the selected voxel.

3. The method of claim 2 wherein the edge-detection operator determines material interface locations from the fit along the analysis direction parameter.

4. The method of claim 1 wherein rasterized presentation of the object is determined from a model of the object.

5. The method as claimed in claim 4, characterized in that the model is a CAD model.

6. The method of claim 1 wherein the edge detection operator further determines a location of at least two directly adjacent material interfaces in the rasterized representation from an indication in the image information of at least one of the plurality of adjacent voxels that plural material interfaces are arranged directly adjacent to each other within the vicinity of the at least one voxel.

7. The method of claim 1 wherein the analysis direction is perpendicular to the material interface to be determined.

8. A device comprising non-transitory computer program product having instructions executable by a computer, which when executed on a computer cause the computer to carry out a method for determining material interfaces of an object from a rasterized representation of the object, the rasterized representation having a plurality of voxels corresponding to positions on the object, each of the voxels having at least one piece of image information which indicates a value of a measurement variable for the object at the position of the corresponding voxel, the method comprising:
for each of a plurality of voxels, based upon at least two parameters specific to the respective voxel, defining an analysis direction parameter within the rasterized representation consisting of a direction within the rasterized representation of the object specific to the respective voxel; and
applying an edge-detection operator to the analysis direction parameters of the plurality of adjacent voxels, wherein the edge-detection operator determines a location of at least one material interface in the rasterized representation from the image information of at least one of the plurality of adjacent voxels and from the image information of least some of the voxels adjacent to the at least one voxel.

9. The device of claim 8 wherein the image information of each voxel comprises at least one gray-scale value indicating the value of the measurement variable for the object at the position of the voxel, and wherein the at least one edge-detection operator determines the location of the material interface by means of a fit of a theoretical model of the gray-scale values for a material interface to the curve of the gray-scale values of voxels in a vicinity of the selected voxel.

10. The device of claim 9 wherein the edge-detection operator determines material interface locations from the fit along the analysis direction parameter.

11. The device of claim 8 wherein rasterized presentation of the object is determined from a model of the object.

12. The device of claim 11 wherein the model is a CAD model.

13. The device of claim 8 wherein the edge detection operator further determines a location of at least two directly adjacent material interfaces in the rasterized representation from an indication in the image information of at least one of the plurality of adjacent voxels that plural of material interfaces are arranged directly adjacent to each other within the vicinity of the at least one voxel.

14. A computer-implemented method for determining material interfaces of an object from a rasterized representation of the object, the rasterized representation having a plurality of pixels corresponding to positions on the object, each of the pixels having at least one piece of image information which indicates a value of a measurement variable for the object at the position of the corresponding pixel, the method comprising:
for each of a plurality of pixels, based upon at least two parameters specific to the respective pixel, defining an analysis direction parameter within the rasterized representation consisting of a direction within the rasterized representation of the object specific to the respective pixel; and applying an edge-detection operator to the analysis direction parameters of the plurality of adjacent pixels, wherein the edge-detection operator determines a location of at least one material interface in the rasterized representation from the image information of at least one of the plurality of adjacent pixels and from the image information of least some of the pixels adjacent to the at least one pixel.

15. The method of claim 14 wherein the image information of each pixel comprises at least one gray-scale value indicating the value of the measurement variable for the object at the position of the pixel, and the at least one edge-detection operator determines the location of the material interface by means of a fit of a theoretical model of the gray-scale values for a material interface to the curve of the gray-scale values of pixels in a vicinity of the selected pixel.

16. The method of claim 15 wherein the edge-detection operator determines material interface locations from the fit along the analysis direction parameter.

17. The method of claim 14 wherein rasterized presentation of the object is determined from a model of the object.

18. The method of claim 17 wherein the model is a CAD model.

19. The method of claim 14 wherein the edge detection operator further determines a location of at least two directly adjacent material interfaces in the rasterized representation from an indication in the image information of at least one of the plurality of adjacent pixels that plural material interfaces are arranged directly adjacent to each other within the vicinity of the at least one pixel.

20. The method of claim 14 wherein the analysis direction is perpendicular to the material interface to be determined.

21. A device comprising non-transitory computer program product having instructions executable by a computer, which when executed on a computer cause the computer to carry out a method for determining material interfaces of an object from a rasterized representation of the object, the rasterized representation having a plurality of pixels corresponding to positions on the object, each of the pixels having at least one piece of image information which indicates a value of a measurement variable for the object at the position of the corresponding pixel, the method comprising:

for each of a plurality of pixels, based upon at least two parameters specific to the respective pixel, defining an analysis direction parameter within the rasterized representation consisting of a direction within the rasterized representation of the object specific to the respective pixel; and applying an edge-detection operator to the analysis direction parameters of the plurality of adjacent pixels, wherein the edge-detection operator determines a location of at least one material interface in the rasterized representation from the image information of at least one of the plurality of adjacent pixels and from the image information of least some of the pixels adjacent to the at least one pixel.

22. The device of claim 21 wherein the image information of each pixel comprises at least one gray-scale value indicating the value of the measurement variable for the object at the position of the pixel, and wherein the at least one edge-detection operator determines the location of the material interface by means of a fit of a theoretical model of the gray-scale values for a material interface to the curve of the gray-scale values of pixels in a vicinity of the selected pixel.

23. The device of claim 22 wherein the edge-detection operator determines material interface locations from the fit along the analysis direction parameter.

24. The device of claim 21 wherein rasterized presentation of the object is determined from a model of the object.

25. The device of claim 24 wherein the model is a CAD model.

26. The device of claim 21 wherein the edge detection operator further determines a location of at least two directly adjacent material interfaces in the rasterized representation from an indication in the image information of at least one of the plurality of adjacent pixels that plural of material interfaces are arranged directly adjacent to each other within the vicinity of the at least one pixel.

* * * * *